United States Patent [19]
Flatow

[11] 4,204,956
[45] May 27, 1980

[54] WATER PURIFICATION SYSTEM

[76] Inventor: Robert E. Flatow, 2010 Farallon Dr., San Leandro, Calif. 94577

[21] Appl. No.: 947,619

[22] Filed: Oct. 2, 1978

[51] Int. Cl.² .............................................. C02B 3/08
[52] U.S. Cl. .................... 210/87; 210/192; 210/199; 422/24; 422/119; 422/121
[58] Field of Search ............... 210/632, 64, 85, 87, 210/192, 199; 422/24, 119, 121

[56] References Cited

U.S. PATENT DOCUMENTS

| | | | |
|---|---|---|---|
| 2,521,054 | 9/1950 | Ellis | 210/146 |
| 3,491,234 | 1/1970 | Wil Trout | 422/24 X |
| 3,672,823 | 6/1972 | Boucher | 422/24 X |
| 3,812,970 | 5/1974 | Yamiazaki | 210/316 |
| 3,837,800 | 9/1974 | Wood | 210/64 X |
| 3,948,772 | 4/1976 | Ellner | 422/24 X |

*Primary Examiner*—John Adee
*Attorney, Agent, or Firm*—Alvin E. Hendricson

[57] ABSTRACT

The system employs a plurality of particularly arraigned ultra-violet lamps emitting high intensity germicidal ultra-violet radiation and radiation producing ozone in the tank through which water is passed with detectors monitoring lamp operation and ultra-violet radiation level throughout the tank for highly efficient purification of fluids passed through the tank.

12 Claims, 7 Drawing Figures

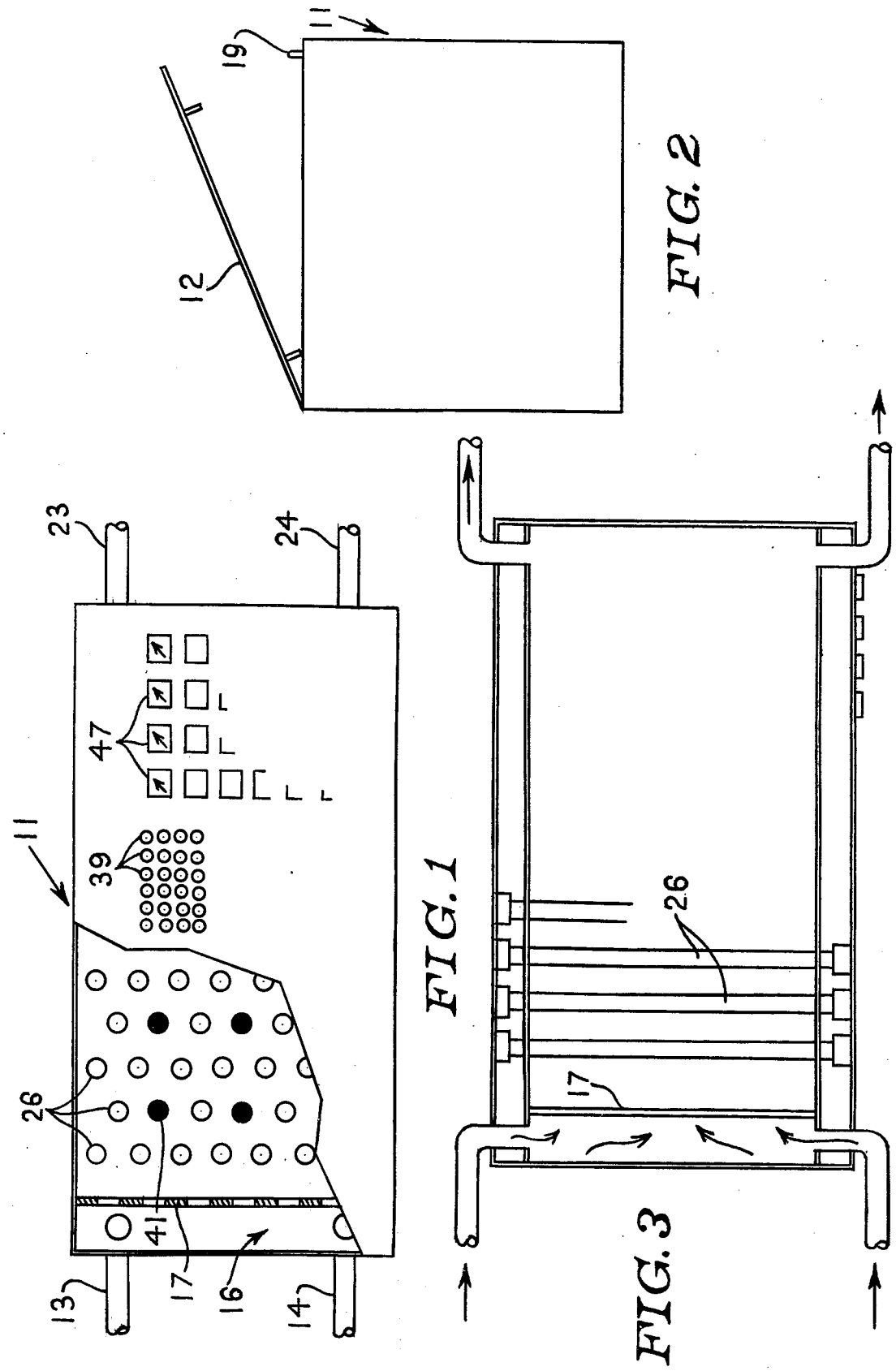

WATER PURIFICATION SYSTEM

BACKGROUND OF INVENTION

The purification of water may encompass a plurality of different types of operations, such as filtering for removal of particles, treatment to destroy microorganisms, either naturally occurring or added, and possibly removal or neutralization of inorganic salts. It has become common practice to chemically treat water for human use as by the addition of chlorine, however, this is a costly procedure and chlorine has now been determined to form suspected carcinogenic compounds. Ozone treatment of water has been employed and found to be very costly in terms of requisite energy expenditure for ozone production by the conventional plate discharge method, in addition to the fact that ozone is very hazardous. Reverse osmosis has also been employed, but to date, such systems are quite inefficient in the use of energy, and furthermore, may not inhibit passage of Gram negative organisms.

It has long been known and accepted that germicidal ultra-violet (UV) radiation will kill microorganisms and consequently UV radiation systems are employed for water purification. Unfortunately, UV radiation is highly attenuated by water and consequently, this manner of water purification has been quite limited.

The present invention provides a system of high intensity UV radiation which is combined with high efficiency ozone production in many applications, for economical and highly effective water purification.

SUMMARY OF INVENTION

The system of the present invention employs a plurality of high intensity germicidal UV lamps in a tank that need not be pressurized and through which water is passed for killing all or substantially all microorganisms in the water. These lamps are closely spaced crosswise to water flow without any baffles or other UV attenuators and detectors in the tank monitor UV radiation dosage received by water at substantially all tank locations. Naturally, the purifier tank is formed of a material and construction which prevents escape of UV radiation and a movable top with interlocks allows safe access to the tank interior.

The present invention may be employed in fish hatcheries, for example, with only germicidal UV radiation to purify the water inasmuch as UV radiation does not leave any residual effect that could harm fish. For other applications, such as water purification for human consumption, the present invention employs an ultra-violet lamp which emits germicidal wavelengths and ozone producing wavelengths. It has been found that a synergistic effect is produced by the combination of ozone and high intensity germicidal UV which is extremely effective in killing microorganisms in water. The emission of UV radiation having wavelengths of the order of 1,894° A in water produces ozone ($O_3$) which is quite unstable and combines with water to produce $H_2O_2$ which is a highly effective purifier and which breaks back down to water so as to leave no residual at some limited distance downstream from purification. Ozone penetrates water quite well and is known to be a good deodorizer, decolorer and a particularly good deoxidizer. Ultra-violet wavelengths of the foregoing order may be generated by conventional UV lamps and are normally filtered out by the quartz jacket or tube about the lamp discharge. Ultra-violet lamps may in themselves include an envelope which filters out or does not filter out radiation wavelengths which produce ozone and with these different lamps, it is only necessary, in accordance with the present invention, to change lamps in fixed quartz jackets in order to radiate or not radiate ozone-producing UV wavelengths. In the present invention, the ozone-producing wavelengths may be intentionally not filtered so as to be emitted directly into water for ozone production. In this manner, the economy and safety of ozone production is materially improved.

The present invention employs what may be considered a thin film system, i.e., a small thickness of water between lamps, but without the use of complicated or expensive physical structure to direct fluid flow. Additionally, the present invention employs no baffles or other UV attenuators in the vicinity of the lamps, so as to maximize the utilization of UV radiation. It is the total dosage of ultra-violet which is effective to kill microorganisms, as further set forth below, and thus any barrier to UV propagation has been found to be undesirable. In this respect, it is noted that wiper blades or the like, previously employed to clean the quartz jackets about the lamps are not herein employed, as they inhibit radiation from the lamps and generally add many mechanical problems, such as the necessity of frequent blade replacement because of wear, and freezing of the blades onto the quartz jackets. The present system employs an in-place backwash cleaning which requires no additional mechanical elements within the tank.

The overall system hereof incorporates a fluid flowmeter and valve ahead of the tank and this is employed in conjunction with the intensity of radiation and tank volume to ensure application of the desired UV dosage to guarantee complete killing of all microorganisms in the fluid passing through the system.

The present invention also provides for aeration of waste water, for example, in order to provide sufficient oxygen or air for irradiation to produce ozone ($O_3$). Efficiency is maximized and thus the cost minimized by injecting oxygen as close as possible to the radiation chamber of the system. Injection of either oxygen or air by the present invention actually lowers, i.e. improves the BOD (biodegradeable oxygen demand) whereas chlorination, as is conventional, raises the BOD to cause "dead" water and is highly toxic to practically all aquatic life.

Inlet fluid is herein directed into the purifier tank laterally and is then passed through a baffle into the main or central tank volume wherein UV lamps are disposed laterally across the fluid flow. In the application of the present invention to waste water purification, holding, and/or settling tanks are provided ahead of the purifier tank solely for the purpose of settling out large objects that might otherwise clog the system. Also, the dosage of UV radiation provided herein may be reduced if the system is employed as a secondary or tertiary stage of a larger system, however, it is noted that in such circumstances, the present invention should preferably be employed as the last purification stage.

DESCRIPTION OF FIGURES

The present invention is illustrated as to a preferred embodiment thereof in the accompanying drawings wherein:

FIG. 1 is a side elevational view of a purifier tank with portions broken away to illustrate the interior arrangement of lamps and detecting means;

FIG. 2 is an end elevational view of the tank of FIG. 1 with the top raised;

FIG. 3 is a top plan view of the tank of FIG. 1 with the top removed;

DESCRIPTION OF PREFERRED EMBODIMENT

Figure 6:
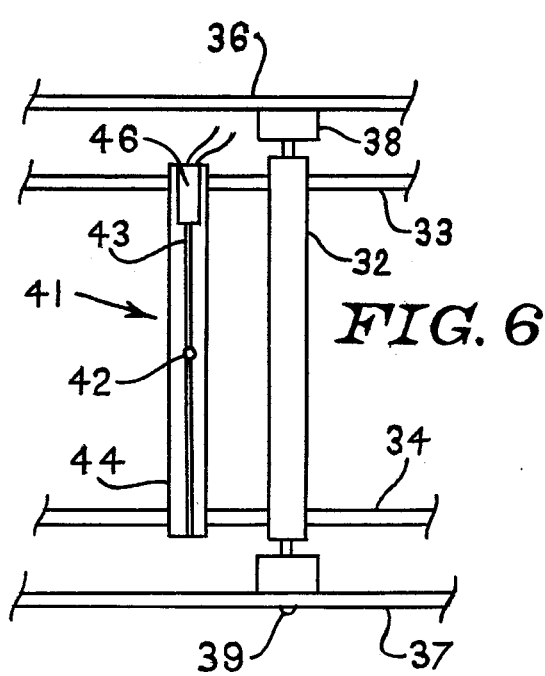
FIG. 6 is a parital schematic illustration of the mounting of an ultra-violet lamp and counter means in the tank of FIG. 1.
Figure 7:
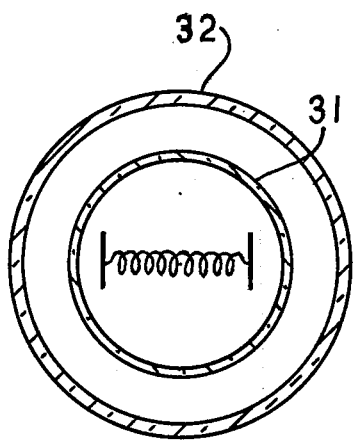
FIG. 7 as a transverse sectional view through a lamp and jacket, as employed in the system of the present invention.

The system of the present invention, as illustrated in the drawings, includes a chamber or tank 11, having a hinged top 12 for access to the interior thereof. This tank need not be pressurized, in distinction to many prior art purification systems. The tank 11 is provided with a pair of inlet lines 13 and 14 directed laterally inward of the tank at the front end thereof and communicating with an inlet chamber or manifold 16 which is separated from the central radiation chamber 18 of the tank by an apertured baffle plate 17. A pair of outlet lines 23 and 24 extend from the sides of the outlet end of the tank 11 for egress of purified water from the tank. The tank top 12 cooperates with a switch 19 in the power line so as to open the switch and deenergize the system at any time that the cover 12 is raised. The present system normally includes a pump 21 which serves to move water or other fluid through the system hereof and the switch 19 serves to deenergize this pump, as through a relay operated solenoid whenever the top 12 is raised. For the purification of water from a well or the like, the lamp units may be disposed on 3 to 3.5 inch centers, however, for waste water purification, it is preferable that the lamps be spaced closer together, as for example, on 2 inch centers. The lamps are located in staggered array, as illustrated in FIG. 1, so as to break up the flow of fluid through the tank. Although various manners of mounting ultra-violet lamps in water are known, the present invention preferably provides for each UV lamp 31 to be disposed axially through a cylindrical quartz jacket 32, as shown in FIG. 7 with the quartz jacket extending in watertight relation through inner tank side walls 33 and 34, as shown in FIG. 6. Outer side walls 36 and 37 of the tank may carry connectors 38 into which the UV lamps are plugged as by female-male connections for energizing the lamps. The outer tank walls 36 and 37 are movable for access to the lamps and connections. By the provision of a quartz jacket about each UV lamp, the possibility of lamp breakage in the tank is materially reduced, and also the jackets provide for the lamps to be operated at desired temperatures for optimum radiation whatever the temperature of water passing through the system. Additionally, each of the UV lamps 31 is provided with an indicator lamp 39 connected in circuit with the lamp for indicating operation of the lamp. These indicator lamps are preferably mounted on one of the outer tank walls 37, so that an operator at a glance can tell whether any of the UV lamps may be inoperative. Failure of a lamp will cause an open circuit so that the associated indicator lamp will not light, and under these circumstances, appropriate steps should be taken to replace the lamp in order to ensure application of the desired UV radiation dosage to fluid passing through the tank.

There is also provided within the tank 11, a plurality of sensing units 41 which are identified in FIG. 1 as black circles to illustrate the position thereof in the lamp array. It will be seen that these sensing units 41 replace alternate lamps in vertical and horizontal planes of FIG. 1. With this arrangement of sensing units in the lamp array, it is possible to monitor the untle-violet ratiation throughout the tank.

Each individual sensing units 41 includes an ultra-violet radiation sensor 42 responsive to UV radiation. Each sensor may be a rod 43 rotatably mounted within a quartz jacket 44 which may be the same as the lamp jacket 32. The sensing units are mounted between the inner tank walls 33 and 34 and each sensing unit may include a small electric motor 46 or suitable mechanical means which may be disposed in or adjacent the quartz jacket 44 and engagine the mounting rod 43 for rotating the sensor 42. The sensors 42 may be mounted and operated in many different ways, and the illustration of FIG. 6 is only exemplary. The sensor 42 is preferably located adjacent the longitudinal center of the quartz jacket thereabout and by rotating the sensor, the output thereof will indicate the UV radiation level incident upon the sensing unit from all sides thereof, so as to identify proper operation and radiation of each of the ultra-violet lamps. The sensors are individually connected to sensor readout meters 47 which may be mounted on the outer tank wall 37, whereby an operator may visually determine the radiation level at a large plurality of locations within the tank, and particularly, will be apprised of any location of low radiation level. Alternatively, the sensors may be consecutively, for example, interrogated either manually or automatically to indicate a radiation level below a predetermined minimum. There are various circumstances which may reduce the level of radiation from an ultra-violet lamp, such as the normal reduction of output with age of the lamp or coating of the surface of the lamp jacket with deposits from the fluid passing through the tank.

The system of the present invention operates to energize the UV lamp elements 26 for establishing a desired, and, in fact, require UV radiation level in the tank 11 for killing all types of microorganisms that may be carried by water or other fluid passed through the tank. At this point, it is worthwhile to note the basic criteria for determination of UV radiation dosage which, in accordance with the present invention is given by the following realtionship:

$$UV\ DOSE = K/L \times RT \times 2050$$

In the foregoing realtionship:

L = number of cubic inches covered per UV Lamp, and this will be noted to be V/N where, V = Volume of fluid in the tank or chamber in cubic inches (wherein the volume displaced by the quartz jackets housing the UV lamps is substracted from the total volume of the tank).

N = number of UV lamps.

RT = Retention Time, in seconds, at rated flow capacity wherein the volume of the chamber in gallons (G) is determined by G = V/231, and the number of tank volume changes per minute at maximum flow is $$RT = \frac{\dfrac{\text{FLOW RATE (in } GPM)}{G}}{\dfrac{60 \text{ Seconds}}{\text{Changes/Minute}}}$$

The factor K in the above-noted UV Radiation dosage formula may be determined by exact relative readout on an accurately calibrated UV light meter, which is calibrated to read only 2537 Angstrom wavelength. This K factor for one type of commercially available lamp is set forth in the following table:

| UV LAMP TYPE | K FACTOR |
| --- | --- |
| RM-10T6 and/or 5½ Series | 135 |
| RS-30T6 Series | 370 |
| RL-60T6 Series | 850 |

(NOTE:
These lamps are manufactured to specification and sold by REFCO Purification Systems, Inc., 2050 Farallen Drive, San Leandro, California).

The foregoing basic formula has been accepted by numerous agencies of the United States Government and is herewith submitted as a proper definition of ultraviolet radiation dosage.

Further, with regard to the treatment of water or other fluids with UV radiation, it is noted that over-radiation does not cause any harm to the fluid being treated or purified. The present invention operated to provide a very large dosage of UV in order to ensure complete destruction of microorganisms. Published literature states tht Pseudomonas fluroescens and Escherichia coli for example, are destroyed by an ultra-violet dosage of 7,040 microwalt seconds $cm^2$ (MWS/$cm^2$), however, the present invention preferably provides a minimum dosage of 35,000 MWS/$cm^2$ to destroy coliforms, psychrophiles, viruses, protozoans and spores likely to be present in water to be purified. It is, of course, important in commercial applications of water purification to minimize the cost thereof, and consequently, it is recommended in accordance with the present invention that a dosage of germicidal and ozone-producing UV radiation be employed for the purification of water of the classifications noted.

A very wide variety of different types of microorganisms may exist in water to be purified. There are, in fact, such a wide variety of microorganisms which may possibly exist that it is almost impossible to provide tables of appropriate UV radiation dosage for each of such organisms. One particularly difficult organism is saprolegnia wherein it has been found in accordance with the present invention that, depending on the fungus strain, a minimum of 25,000 to 30,000 microwatt seconds per square centimeter of germicidal UV is required to kill all of the organisms. Iron bacteria is also of considerable importance in the purification of water. This term, which may, in fact, be misleading, is defined as "bacteria, iron. Bacteria that live in iron containing water and obtain their energy by oxidation of ferrous salts to ferric hydroxide,, that is, Callionella. Other iron bacteria can grow in the absence of ferrous salts, such as *Leptothrix ochracea*. Others, like Siderocapsa, liver heterotrophically". So called iron bacteria prove to be extremely troublesome in many water supply systems, particularly because of the rapid multiplication thereof, which may, in fact, even clog or close pipe lines. The present invention is directed to the extermination of iron-bacteria, as well as other microorganisms in water purified by the present system.

Figure 4:
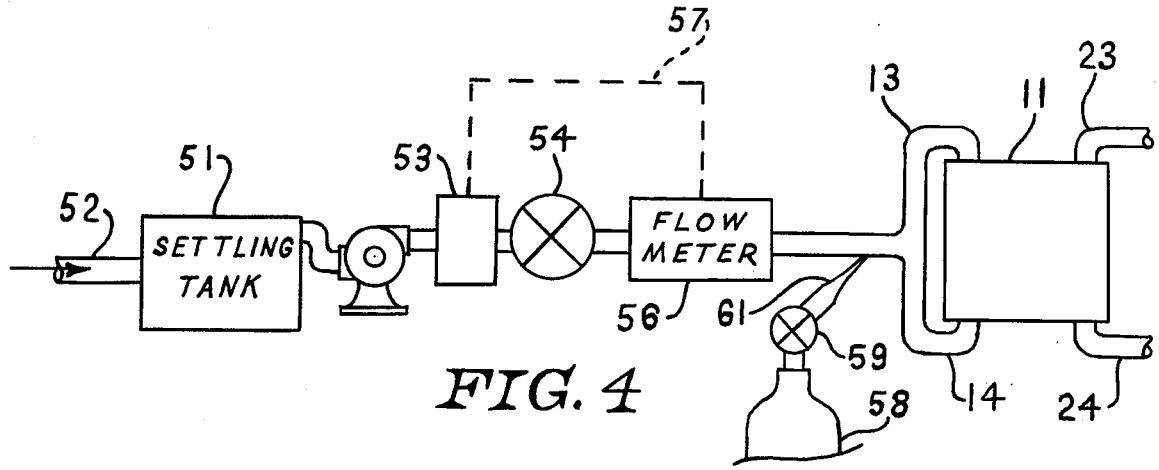
FIG. 4 is a schematic illustration of an overall purification system including the tank of FIG. 1.

A particular system in accordance with the present invention employs the tank 11, as described above, in combination with various other elements provided in accordance with the particular application of the present invention. Reference is made to FIG. 4 of the drawings wherein the purifying chamber or tank 11 is shown to be proceeded by a settling tank 51 which may be provided in a system employed for the purification of waste water fed into the system from a line 52. Output of the settling tank may be pumped through a filter 53 and then through a control valve 54 for controlling the volume of fluid flow through the system. A flow meter 56 following the control valve 54 measures the flow to the tank 11 so that the control valve 54 may be adjusted to establish a desired flow rate. This portion of the system may be automated by providing the flow meter with adjustable control means so as to produce an output signal when the measured flow of fluid varies a predetermined amount from a desired value and so as to apply this signal to operate the control valve 54. This automatic control is schematically illustrated by the dashed line 57. Determination of the desired flow rate through the purification chamber or tank is determined in accordance with the above-identified UV dosage formula together with the predetermined required dosage of germicidal UV radiation required to kill the microorganisms present and the characteristics of the fluid to be purified, as further discussed below.

The system may also include means for adding air or preferably oxygen to the water ahead of the tank 11. In FIG. 4 there is shown an oxygen bottle 58 connected to the water line through a valve 59 and venture 61. Some water may carry enough air or oxygen for ozone production, but some does not, so the bubbling of air or oxygen into the water is determined by the situation.

Figure 5:
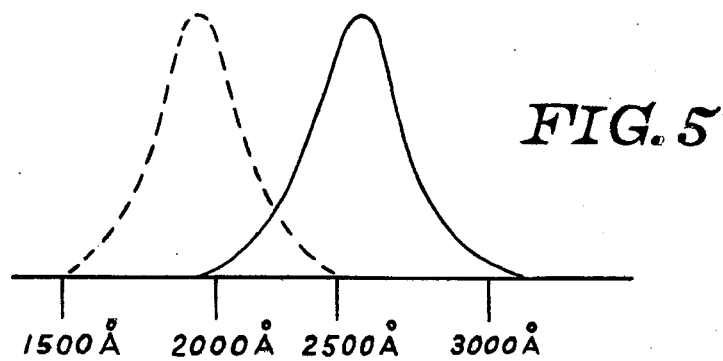
FIG. 5 is a graph illustrating ultra-violet radiation by a lamp of the present invention.

In addition to the radiation of water, for example, by high intensity germicidal UV radiation, the present invention provides for radiation of the fluid with UV radiation of a wavelength producing ozone in the water. As noted above, certain applications of the present invention may not be susceptible to the use of ozone purification, such as the location of the purifier immediately ahead of fish tanks or the like. Ozone is, of course, very deadly to marine life. However, ozone does rapidly break down in water so that germicidal UV and ozone treatment of water does not ultimately provide any danger to marine life. Particularly with regard to waste water purification, wherein the fluid from sewers is to be purified, it is highly advantageous to employ the present invention incorporating ozone purification. In FIG. 5 of the drawings, there is illustrated a graph of the wavelengths of ozone producing UV radiation generated by an ultra-violet lamp. The lamp envelope is formed of glass or quartz having particular filtering properties in accordance with known formulations, so that the wavelengths illustrated in FIG. 5 may be intentionally filtered or not filtered out of the radiation emitted from the lamp. Well made UV lamps, such as those identified previously herein, produce high intensity germicidal UV radiation having a wavelength of the order of 2,537 angstroms (253.7 nanometers) and may or may not emit high intensity radiation having a wavelength of the order of 1,849 angstroms (184.9 nanometers) for the production of ozone in water. Filtering or not filtering of the 184.9 nanometer radiation is accomplished by the choice of particular formulation of quartz glass both for the lamps and jackets about the lamps. It has also been found that carefully constructed UV lamps may, in themselves, limit or not limit 184.9 nanometer radiation, so that the same quartz jackets may be employed with either type of UV lamp. This is higly advantageous in the present invention, inasmuch as ozone production may be accomplished merely be replacing germicidal UV lamps with germicidal and ozone UV lamps. The emission of both germicidal UV and ozone producing UV has been found to excite the water in a synergistic radiation so that a remarkably improved purification action results. As noted previously, ozone is created in the water itself by radiating the water with UV radiation having a wavelength of the order of 1,849 angstroms, and this ozone in the water rapidly turns into hydrogen peroxide to create a safe and very highly effective disinfecting agent, in addition to the disinfecting action of the germicidal UV radiation. It has long been recognized that UV rays leave no residual so that the present system is completely safe and even under the circumstances where ozone purification is combined with germicidal UV purification, the water is safe at some distance from the purification location for ozone rapidly breaks down into hydrogen peroxide which then further breaks down into water. Air or oxygen is bubbled through the water prior to UV radiation to enhance ozone production.

It is to be noted that the present invention provides a much safer method of creating and employing ozone than has commonly been employed in the prior art. In the first place, ozone is formed in the water itself, rather than in air so that the possibility of ozone escaping into the atmosphere is materially limited. Ozone is known to be very hazardous to the health, even in minute quantities, so that the present invention provides a material advancement in this respect. Additionally, the common means employed for generating ozone is to establish a discharge between electric plates in air, and it is well known that this is a relatively inefficient manner of generating ozone, inasmuch as a large amount of energy is expended for the generation of a small amount of ozone. Thus the present invention provides a further advancement in the inexpensive generation of ozone for water purification. It has, in fact, been determined that no further energy is required for the present invention to generate ozone than for the invention only to generate germicidal UV radiation. The electrical energy required for UV water purification is very small, and the energy cost may be as low as penny per 20,000 gallons of water purified.

As water passes through the purifier tank 11 of the present invention, it is operated upon by germicidal UV radiation, and a sufficient dosage of radiation is applied to preferably ensure destruction of all microorgranisms in the water. The indicator lamps 39 will immediately identify to an operator the failure of any lamp, so that it may be replaced. The sensor means 41 detect or sense the UV radiation level at the locations of these sensors in the tank and the meters 47 read out these radiation levels so that operator may readily detemine whether or not any tank volume may be received less than the required amount of radiation. Low radiation level may result from lamp aging or possibly by depositions on the quartz jackets 32 of the lamps 31. Under these circumstances, the lamps may be replaced as required, and/or the system may be cleaned. The present invention does not incorporate wiper blades or the like for cleaning the quartz jackets for, as noted above, such elements merely inhibit radiation from the lamps. Alternatively, the present invention provides for in-place cleaning by flush cleaning with a chemical such as sodium hypochloride. Such cleaning has been found to be required only very occasionally and for a short period of time.

The purifier tank or chamber of the present invention is also noted to contain no baffles or the like, in the treatment portion thereof. An inlet baffle is provided, as illustrated and described above, to direct the flow of water in a turbulent manner through the central portion of the tank wherein the lamps are located. Although many UV water purification systems employ baffles to direct water in predetermined paths, it has been found that such baffles actually decrease effectiveness of the UV radiation in purifying the water. Although UV rays are attenuated in passage through water, it is the cumulative radiation effect which causes the disinfecting action. Consequently, even attenuated UV rays are effective in combination to purify water. The present invention operates to allow the radiated ultra-violet to travel as far as possible in the water, so that cumulative radiation effects are achieved and maximum purification is attained with minimum energy expenditure. As previously noted, the lamps of the present invention are arraigned in staggered array, so that it is not possible for any stream of water to pass through the tank without all portions thereof being in such close proximity to UV lamps that the desired UV dosage of the water is achieved. In this manner, the present invention provides for maximum purification effectiveness.

It will, of course, be understood that the present invention is to be engineered in accordance with particular application thereof. Thus, for example, the desired flow rate is an important criteria in establishing the size of a purification tank. Additionally, the content of the water to be purified is important in the design of a system in accordance with the present invention. While it has often been stated that turbidity of water will render UV radiation ineffective, such is not necessarily the case. The ability of water to transmit light is not determinative of the transmission of ultra-violet rays. Certain organic materials in water materially do, however, increase the absorption of ultra-violet, and in such cases, it may be necessary to employ activated charcoal absorbtion filters or the like, to remove the absorbing material from the water. It has also been considered by many that the presence of iron in water will inactivate ultra-violet, however, it has been found that with up to five parts per million, there is no problem with high dosage of UV radiation. Other hard water ions, such as calcium, silicates, magnesium, or the like, provide no problem when present in water purified in accordance with the present invention.

It will be appreciated from the foregoing that the present invention provide a material advancement in the purification of water and other fluids by the provision of high dosage UV radiation without the necessities of chemical additions to the water. The problems of chemical or other treatment are becoming well known, and the present invention provides an advantageous alternative thereto which leaves no residue in the water and consequently produces no deleterious side effects. In addition, the present invention is capable of purifying water at a much lower cost than conventional water treatment systems, and this invention is even applicable as a primary purifier for waste water. Naturally, the invention is also applicable for use as a secondary or tertiary portion of larger purification systems, and in such cases, the invention may be operative with less stringent requirements. As noted above, the separation of lamps depends in good part upon the condition of the water to be purified, so that with highly contaminated waste water, the lamp centers should preferably be spaced not more than 2 inches apart on centers, however, when the invention is employed with much less contaminated water, the lamp centers may be spaced apart as much as 3½ inches. In any event, the space between lamps is relatively small so that truly high dosage UV radiation is applied to the water passing through the present system. Over radiation cannot harm the quality of water while under radiation will result in failure to kill all of the microorganisms intended. It is also noted that the present invention is not limited to killing microorganisms of any particular electrical charge for both Gram positive and Gram negative organisms are effectively destroyed hereby.

Although the present invention has been described with respect to a single preferred embodiment thereof, it will be appreciated that numerous modifications and variations are possible within the spirit and scope of the present invention, and thus it is not intended to limit the invention to the precise terms of description or details of illustration.

What is claimed is:

1. A water purification system comprising
a tank having a plurality of parallel high intensity ultra-violet lamps disposed laterally across the tank in evenly spaced array with the lamps thereof disposed in close proximity without ultra-violet attenuators therebetween,
water inlet means including an apertured diffusion plate directing water uniformly through said tank laterally across said lamps for irradiation of said water with high intensity ultra-violet rays, and
sensing means disposed in spaced relation uniformly throughout said lamp array in said tank for indicating the intensity of ultra-violet radiation as received by water passing through said tank.

2. The system of claim 1 further defined by cylindrical quartz jackets disposed one about each of said lamps for protecting said lamps and transmitting ultra-violet radiation.

3. The system of claim 2 further defined by
said jackets transmitting radiation having wavelengths of the order of 253.7 nanometers and 184.9 nanometers and said lamps being divided into first and second types of lamps replaceably mounted in said jackets, with said first type emitting both of said wavelengths and said second type emitting only wavelengths of the order of 253.7 nanometers.

4. The system of claim 1 further defined by
a flow control valve, and
a flow meter for indicating the rate of flow of water through said tank for adjustment of said flow control valve to establish a predetermined dosage of ultra-violet radiation for all water passing through said tank.

5. The system of claim 4 further defined by the relationship for ultra-violet radiation dosage being $$\text{Dosage} = K/L \times RT \times 2050$$

where:
L = volume of tank in cubic inches divided by the number of lamps;
RT = retention time = one divided by the flow rate in gallons/second over the tank volume in gallons;
K = a lamp constant for 2537 Å wavelength emission.

6. The system of claim 1 further defined by
the lamps of said array being disposed in equal spaced relation in vertical planes with the lamps of successive planes being vertically offset one-half the vertical lamp spacing to thus dispose all lamps in successive vertical and horizontal planes, and
alternate lamps in each of said vertical and horizontal planes being replaced by ultra-violet radiation detectors.

7. The system of claim 6 further defined by
quartz jackets disposed about each of said lamps and sensors.

8. The system of claim 7 further defined by
said jackets being spaced apart between centers, a distance in the range of two inches to three and one-half inches.

9. The system of claim 1 further defined by
said tank having an inlet chamber on the inlet side of said apertured plate ahead of said lamps with inlet lines communicating with the sides of said chamber for ingress of water to be purified.

10. The system of claim 1 further defined by
said lamps emitting ultra-violet radiation of wavelengths of the order of 2537 Å for irradiating water with germicidal ultra-violet radiation and 1849 Å for generating ozone in the water to additionally purify the water.

11. The system of claim 10 further defined by
means injecting air or oxygen into water immediately prior to entry into the tank volume containing said ultra-violet lamps for aerating the water to maximize ozone production by 1849 Å ultra-violet radiation.

12. The system of claim 1 further defined by said tank being non-pressurized and having a moveable top for access to the tank interior with interlocking means for deenergizing said lamps and terminating fluid flow through said tank upon top opening.

* * * * *